Figure 2:
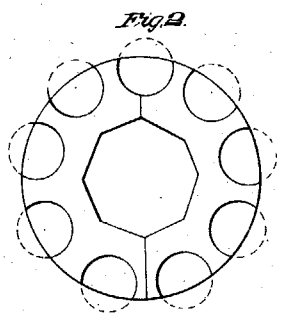
Figure 3:
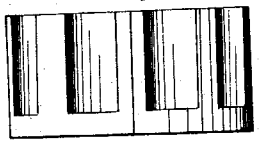
Figure 4:
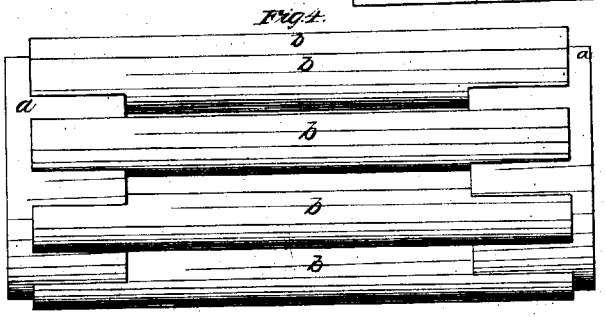
Figure 1:
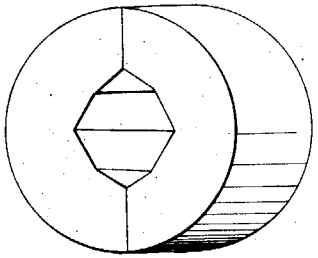
Figure 5:
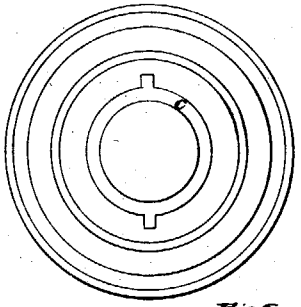
Figure 6:
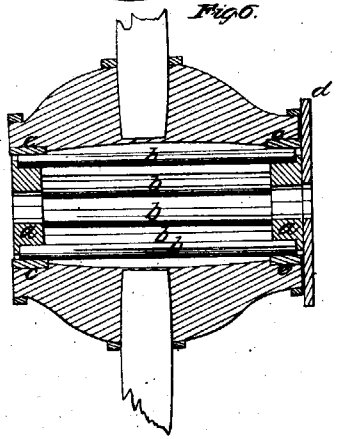

No Printed Specification Available

730X

E. Lester,

Casting Trundle-Heads for Axletrees,

Patented Feb. 12, 1807.

730X Feb. 12. 1807 1[illegible]

Ebenezer Tesler

Letters Patent

The schedule referred to in these Letters Patent and making part of the same containing a description in the words of the said Ebenezer Tesler himself of his method of making moulds for casting trundle heads of any kind of metal for the axletrees of wheels and of wheel carriages of every size & description.

Take two pieces of well seasoned plank of (say) an inch and a half thickness each - cut them exactly round and each of a semidiameter (say) three inches and joint them so that they will come close together; then draw another circle on one side of each piece of the diameter of (say) two inches, then bore with a joiners bit (say) nine or twelve three quarter inch holes in each piece, outside of the circles at exact distance from each other, to the depth of (say) one inch and a quarter the inner edge of each hole coming to the circular line, and the outer circumference of the holes will then extend a quarter of an inch beyond the circumference of each of the two pieces. The pieces are then to be put together and round rollers are put into each of the holes bored in manner aforesaid ([illegible] are to be so loose as to be turned round with ease) the rollers however are to be cast by themselves) then cut an eight sided hole through the centre of the two pieces of the diameter of (say) one inch and a half and the making of the models are then completed. The trundle heads when cast are fastened firmly upon the axletrees so as to come in contact with and exactly fill the two iron boxes which are usually placed in each end of the hub of the wheels of the carriage. The axletree ought to be of iron; it may however be of wood. The advantage contemplated to be derived from the above plan is, that the wheel will turn much easier upon the axletree by means of resting upon the rollers, which turn as the wheel turns as the friction will not be half so great as in the common method now in use, it is also expected that the oil or tar (whatever it may be) which may be applied to the rollers to make them turn easier, will not exhaust near so quickly as that which is applied to the axletrees of wheels in the usual manner. at the same time the axletree will be saved from

730 X

178.

wearing and the expence of "keans" will also be saved. It is expected that
the undermost Rollers will wear out the fastest on account of their bearing
the greatest weight, but this may be remedied by occasionally changing
them, by unloosing the trundle head from the axletree, then placing those
which were under, uppermost &c. and when all the rollers ... become
worn out, new ones can be put in. There ought to be a narrow rim on the
which slight [illegible] of the [illegible] by having the trundle heads
outer end of each of the trundle heads, to fill the boxes of the Hubs ex-
actly. very little dirt would work in. The trundle heads ought to be a
little longer than the boxes of the hub. as it is usual to leave the wheel
room enough to play off and on upon the axletree as much as half an inch
or more. The above dimensions of the trundle heads are given merely
for (original defaced) They may be (original obliterated) diameter &c. as will
be found most convenient.

Ebenezer Lester

[illegible] In presence of
1196. Ephraim Snow
Alvah Sharp

Drawing made [illegible] 1841 (616 words)

(Patented Feb. 12. 1807)